(12) United States Patent
Schultz et al.

(10) Patent No.: US 9,895,733 B2
(45) Date of Patent: Feb. 20, 2018

(54) SYSTEMS AND METHODS FOR EXTRUDING TUBES

(71) Applicants: Robert W. Schultz, Leechburg, PA (US); Gerry J. Dail, West Lafayette, IN (US); Ronald Eugene Roadman, Murrysville, PA (US); Al Borges, Lafayette, IN (US)

(72) Inventors: Robert W. Schultz, Leechburg, PA (US); Gerry J. Dail, West Lafayette, IN (US); Ronald Eugene Roadman, Murrysville, PA (US); Al Borges, Lafayette, IN (US)

(73) Assignee: Arconic Inc., Pittsburgh, PA (US)

( * ) Notice: Subject to any disclaimer, the term of this patent is extended or adjusted under 35 U.S.C. 154(b) by 208 days.

(21) Appl. No.: 14/619,692

(22) Filed: Feb. 11, 2015

(65) Prior Publication Data

US 2015/0283594 A1 Oct. 8, 2015

Related U.S. Application Data

(60) Provisional application No. 61/938,349, filed on Feb. 11, 2014.

(51) Int. Cl.
*B21C 37/16* (2006.01)
*B21C 25/02* (2006.01)
(Continued)

(52) U.S. Cl.
CPC .......... *B21C 37/16* (2013.01); *B21C 23/085* (2013.01); *B21C 25/02* (2013.01); *B21C 25/04* (2013.01); *F16L 9/006* (2013.01); *F16L 9/02* (2013.01)

(58) Field of Classification Search
CPC ....... B21C 23/08; B21C 23/217; B21C 25/02; B21C 25/04; B21C 25/08; B21C 37/16;
(Continued)

(56) References Cited

U.S. PATENT DOCUMENTS 3,176,494 A 4/1965 Cullen et al.
4,301,672 A * 11/1981 Simon ................. B21C 25/08
72/260

(Continued)

FOREIGN PATENT DOCUMENTS

JP 59-056930 A * 4/1984 ............ B21D 39/04

OTHER PUBLICATIONS

International Search Report and Written Opinion from international Application No. PCT/US2015/015396 dated May 15, 2015.

*Primary Examiner* — Edward Tolan
(74) *Attorney, Agent, or Firm* — Greenberg Traurig, LLP (57) ABSTRACT

In some embodiments, the instant invention provides for a method including: extruding, utilizing a first die and a mandrel, a hollow tube having a first tube section having a first outer tube diameter of Z, a first inner tube diameter, and a first length; extruding, utilizing a second die and the mandrel, continuing from an end of the first tube section, a hollow tube having a second tube section having a second inner tube diameter and a second length, where the second die has a first die section, and where an angle of a wall of the first die section of the second die relative to a longitudinal axis of the hollow tube ranges from 10 to 45 degrees; extruding a third tube section, a third inner tube diameter, and a third length, and producing a monolithic hollow stepped tube extrudate.

8 Claims, 11 Drawing Sheets

(51) Int. Cl.
*B21C 25/04* (2006.01)
*F16L 9/00* (2006.01)
*F16L 9/02* (2006.01)
*B21C 23/08* (2006.01)

(58) Field of Classification Search
CPC ........ B21C 37/18; B21C 23/085; F16L 9/006; F16L 9/02
See application file for complete search history.

(56) References Cited

U.S. PATENT DOCUMENTS

| | | | |
|---|---|---|---|
| 4,616,500 A * | 10/1986 | Alexoff | B21C 1/24 72/276 |
| 5,022,252 A | 6/1991 | Wellman et al. | |
| 5,213,250 A * | 5/1993 | Simon | B21K 1/063 228/114 |
| 5,595,085 A | 1/1997 | Chen | |
| 7,401,486 B2 * | 7/2008 | Okui | B21C 3/04 72/253.1 |
| 2001/0002547 A1 * | 6/2001 | Sahlem | B21C 23/085 72/260 |
| 2010/0263428 A1 | 10/2010 | Yamamoto et al. | |

* cited by examiner

SYSTEMS AND METHODS FOR EXTRUDING TUBES

RELATED APPLICATIONS

This application claims the priority of U.S. provisional application U.S. Patent Appln. No. 61/938,349; filed Feb. 11, 2014; entitled "SYSTEM AND METHOD FOR EXTRUDING TUBES," which is incorporated herein by reference in its entirety for all purposes.

TECHNICAL FIELD

In some embodiments, the instant invention is related to methods of producing a hollow extrudant.

BACKGROUND

Hollow tubes are a type of rod and bar aluminum that has been hollowed out inside through the use of a standard extrusion die. Aluminum hollow tubes come in a variety of shapes, and can be used for food processing equipment, as a means of transporting liquids in heat exchangers, in water treatment plants and also in many other industrial applications. From the automotive industry to construction, manufacturing and many other different industries, there is extensive call and use for square, circular, solid and hollow aluminum tubes.

SUMMARY OF INVENTION

In some embodiments, the instant invention provides for a method including: extruding, utilizing a first die and a mandrel, a hollow tube having a first tube section having a first outer tube diameter of Z, a first inner tube diameter, and a first length, where Z ranges from 1 inch to 10 inches; extruding, utilizing a second die and the mandrel, continuing from an end of the first tube section, a hollow tube having a second tube section having a second inner tube diameter and a second length, where the second die has a first die section having a first end and a second end, where the first end of the first die section of the second die has a first internal die diameter being equal to Z, where the second end of the first die section of the second die has a second internal die diameter of Y, where an internal die diameter of the first die section of the second die continuously vary along the length of the first die section of the second die from Z to Y of the second internal die diameter, and where an angle of a wall of the first die section of the second die relative to a longitudinal axis of the hollow tube ranges from 10 to 45 degrees; extruding, utilizing a second die section of the second die and the mandrel, continuing from an end of the second tube section, a third tube section having a third outer tube diameter being equaled to Y, a third inner tube diameter, and a third length, where Y ranges from 1.5 inches to 10 inches, where Z is less than Y; where the first inner tube diameter, the second inner tube diameter, and the third inner tube diameter are equal; and producing a monolithic hollow stepped tube extrudate.

In some embodiments, the method further includes using a step die holder (101) and a step die bolster to hold the first and the second dies. In some embodiments, the second outer tube diameter continuously varies along the second length of the second tube section. In some embodiments, Z ranges from 3 inches to 6 inches. In some embodiments, Y ranges from 7 inches to 10 inches. In some embodiments, the angle of the wall of the first die section of the second die relative to the horizontal line ranges from 10 to 15 degrees. In some embodiments, the angle of the wall of the first die section of the second die relative to the horizontal line ranges from 15 and 18 degrees. In some embodiments, the hollow tube is an aluminum alloy, where the aluminum alloy is selected from the group consisting of: 1xxx, 2xxx, 3xxx, 4xxx, 5xxx, 6xxx, 7xxx, 8xxx, and 9xxx aluminum alloys.

In some embodiments, the instant invention provides for a tube, including: a monolithic hollow stepped tube extrudate, having: a first tube section having a first outer tube diameter of Z, a first inner tube diameter, and a first length, where Z ranges from 1 inch to 10 inches, a second tube section which continues from an end of the first tube section and has a second inner tube diameter, and a second length; where the second tube section has a first end and a second end, where the first end of the second tube section has an outer diameter equal to Z, where the second end of the second tube section has an outer diameter of Y, where a second outer tube diameter of the second tube section continuously varies from Z to Y; a third tube section which continues from the second end of the second tube section and has a third outer tube diameter equal to Y, a third inner tube diameter, and a third length, where Y ranges from 1.5 inches to 10 inches, where Z is less than Y; and where the first inner tube diameter, the second inner tube diameter, and the third inner tube diameter are equal; and where the second tube section is at an angle relative to a longitudinal axis of the third tube section and ranges from 10 to 45 degrees.

In some embodiments, the second outer tube diameter continuously varies along the second length of the second tube section. In some embodiments, Z ranges from 3 inches to 6 inches. In some embodiments, Y ranges from 7 inches to 10 inches. In some embodiments, the second tube section is at an angle relative to a longitudinal axis of the third tube section and ranges from 10 to 15 degrees. In some embodiments, the second tube section is at an angle relative to a longitudinal axis of the third tube section and ranges from 15 and 18 degrees. In some embodiments, the hollow tube is an aluminum alloy, and where the aluminum alloy is selected from the group consisting of: 1xxx, 2xxx, 3xxx, 4xxx, 5xxx, 6xxx, 7xxx, 8xxx, and 9xxx aluminum alloys.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DESCRIPTION OF EXEMPLARY EMBODIMENTS

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, "monolithic" refers to a product created/produced in one piece. A monolithic product (i.e., a monolithic hollow stepped tube extrudate) is produced without any subcomponents (i.e., a non-modularized, non-componentized, non-dismantleable product) and is made of an aluminum alloy.

In some embodiments, the method includes, but is not limited to, first extruding a first tube section having a first outer diameter ("X") and first length using a first die. In some embodiments, the method further includes, second extruding a second tube section having a second outer diameter and a second length using a second die. In some embodiments, the method further includes, third extruding a third tube section having a third outer diameter ("Y") and a third length using the second die. In some embodiments, the first outer diameter is less than the third outer diameter. In some embodiments, the second outer diameter varies along the length of the second tube section. In some embodiments, the second outer diameter ranges from the first outer diameter to the third outer diameter along the length of the second tube section.

In some embodiments, the first outer diameter ranges from 1 inch to 10 inches. In some embodiments, the first outer diameter ranges from 1 inch to 8 inches. In some embodiments, the first outer diameter ranges from 1 inch to 6 inches. In some embodiments, the first outer diameter ranges from 1 inch to 4 inches. In some embodiments, the first outer diameter ranges from 1 inch to 2 inches. In some embodiments, the first outer diameter ranges from 2 inches to 5 inches. In some embodiments, the first outer diameter ranges from 3 inches to 6 inches. In some embodiments, the first outer diameter ranges from 4 inches to 7 inches. In some embodiments, the first outer diameter ranges from 7 inches to 10 inches. In some embodiments, the first outer diameter is 4 inches. In some embodiments, the first outer diameter is less than 1 inch. In some embodiments, the first outer diameter is greater than 10 inches.

In some embodiments, the third outer diameter ranges from 1.5 inches to 10 inches. In some embodiments, the third outer diameter ranges from 2 inches to 8 inches. In some embodiments, the third outer diameter ranges from 2 inches to 6 inches. In some embodiments, the third outer diameter ranges from 2 inches to 5 inches. In some embodiments, the third outer diameter ranges from 3 inches to 5 inches. In some embodiments, the third outer diameter ranges from 4 inches to 6 inches. In some embodiments, the third outer diameter ranges from 5 inches to 7 inches. In some embodiments, the third outer diameter ranges from 7 inches to 10 inches. In some embodiments, the third outer diameter is 5 inches. In some embodiments, the third outer diameter is less than 1.5 inches. In some embodiments, the third outer diameter greater than 10 inches.

In some embodiments, the second die includes a first die section having a first inner diameter. In some embodiments, the first inner diameter varies along the length of the first die section. In some embodiments, the first inner diameter ranges from the first outer diameter to the third outer diameter.

In some embodiments, an angle of a wall of the first die section of the second die relative to a horizontal line (angle "X"), ranges from 10 to 50 degrees. In some embodiments, X ranges from 10 to 15 degrees. In some embodiments, X ranges from 15 to 20 degrees. In some embodiments, X ranges from 15 and 18 degrees. In some embodiments, X ranges from 10 to 45 degrees. In some embodiments, X ranges from 20 to 30 degrees. In some embodiments, X ranges from 20 to 25 degrees. In some embodiments, X ranges from 20 and 23 degrees. In some embodiments, X ranges from 27 to 30 degrees. In some embodiments, X ranges from 30 to 40 degrees. In some embodiments, X ranges from 30 to 35 degrees. In some embodiments, X ranges from 30 to 33 degrees. In some embodiments, X ranges from 37 to 40 degrees. In some embodiments, X ranges from 40 to 50 degrees. In some embodiments, X ranges from 40 to 45 degrees. In some embodiments, X ranges from 40 to 43 degrees. In some embodiments, X ranges from 47 to 50 degrees.

In some embodiments, at least one of the first, second or third extruding steps include use of a mandrel. In some embodiments, the outer diameter of the mandrel is about equal to a second inner diameter of the first tube section. In some embodiments, the second inner diameter of the first tube section is equal to an inner diameter of each of the second tube section and the third tube section. In some embodiments, the second inner diameter of the first tube section is less than the inner diameters of the second tube section and/or the third tube section.

In some embodiments, the inner diameters of the tube range from 0.5 inches to 8 inches. In some embodiments, the inner diameters of the tube range from 0.5 inch to 7 inches. In some embodiments, the inner diameters of the tube range from 0.5 inch to 6 inches. In some embodiments, the inner diameters of the tube range from 0.5 inch to 4 inches. In some embodiments, the inner diameters of the tube range from 0.5 inch to 3 inches. In some embodiments, the inner diameters of the tube range from 2 inches to 5 inches. In some embodiments, the inner diameters of the tube range from 3 inches to 6 inches. In some embodiments, the inner diameters of the tube range from 4 inches to 7 inches. In some embodiments, the inner diameters of the tube range from 7 inches to 10 inches. In some embodiments, the inner diameters of the tube range are 3.5 inches. In some embodiments, the inner diameters of the tube are less than 0.5 inches. In some embodiments, the inner diameters of the tube are greater than 8 inches.

In some embodiments, the system includes, but is not limited, the second die described herein. In some embodiments, the system includes the first die, the second die and the related equipment such as a step die holder, and a step die bolster.

In some embodiments, the tube is an aluminum alloy. In some embodiments, the aluminum alloy may include 1xxx (aluminum >=99%), 2xxx (copper based), 3xxx (manganese based), 4xxx (silicon based), 5xxx (magnesium based), 6xxx (magnesium and silicon based), 7xxx (zinc based), 8xxx, or 9xxx aluminum alloys. In some embodiments, the tube may be formed of other metals.

In some embodiments, the extrusion is produced using multiple dies or die portions of various geometries. In some embodiments, the dies or die portions are arranged such that the billet is first extruded to produce the smaller section of desired length. In some embodiments, the extrusion process is stopped and portions of the tooling/dies are removed and or replaced to produce the larger cross section of desired length. In some embodiments, in each extrusion step, the extrusion takes place over a mandrel. In some embodiments, the mandrel produces a hollow monolithic tube with multiple cross sections.

In some embodiments, a monolithic part eliminates the required for welding or a mechanical connection between two different geometries. In some embodiments, elimination of a mechanical connection allows the finished product to fit within a smaller envelope. In some embodiments, elimination of the weld results in higher strength, better corrosion resistance, elimination of post weld inspection and post weld aging.

Illustrative Examples

FIGS. 1-14b show non-limiting examples of embodiments of the present invention.

Figure 1:
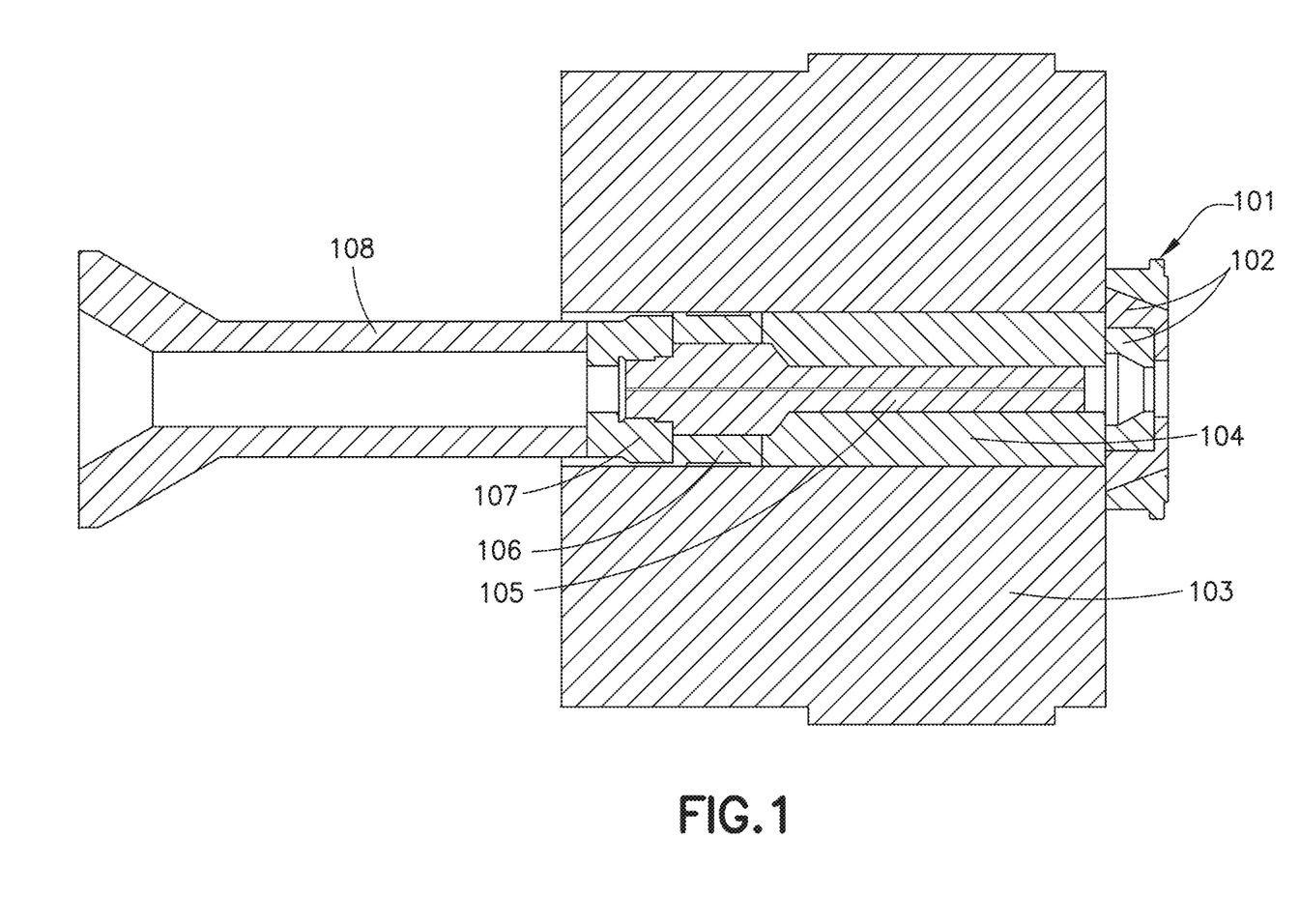
FIGS. 1-3 illustrate some embodiments of the method of the present invention to produce an extrudant using a first set of die.

FIG. 1 illustrates a billet loaded into an extrusion press cylinder container in preparation for the first extrusion step of an embodiment of the present invention. FIG. 1 illustrates that the billet is loaded, the extrusion stem assembly and mandrel are moved up against the billet and the first set of dies are locked into position for the extrusion cycle to begin. The following are shown in FIG. 1: die holder (101), first set of die inserts installed in die holder (102), cylinder container (103), aluminum hollow billet (104), mandrel (105), hollow dummy block (106), ram nose (107), and stem or ram (108).

Figure 2:
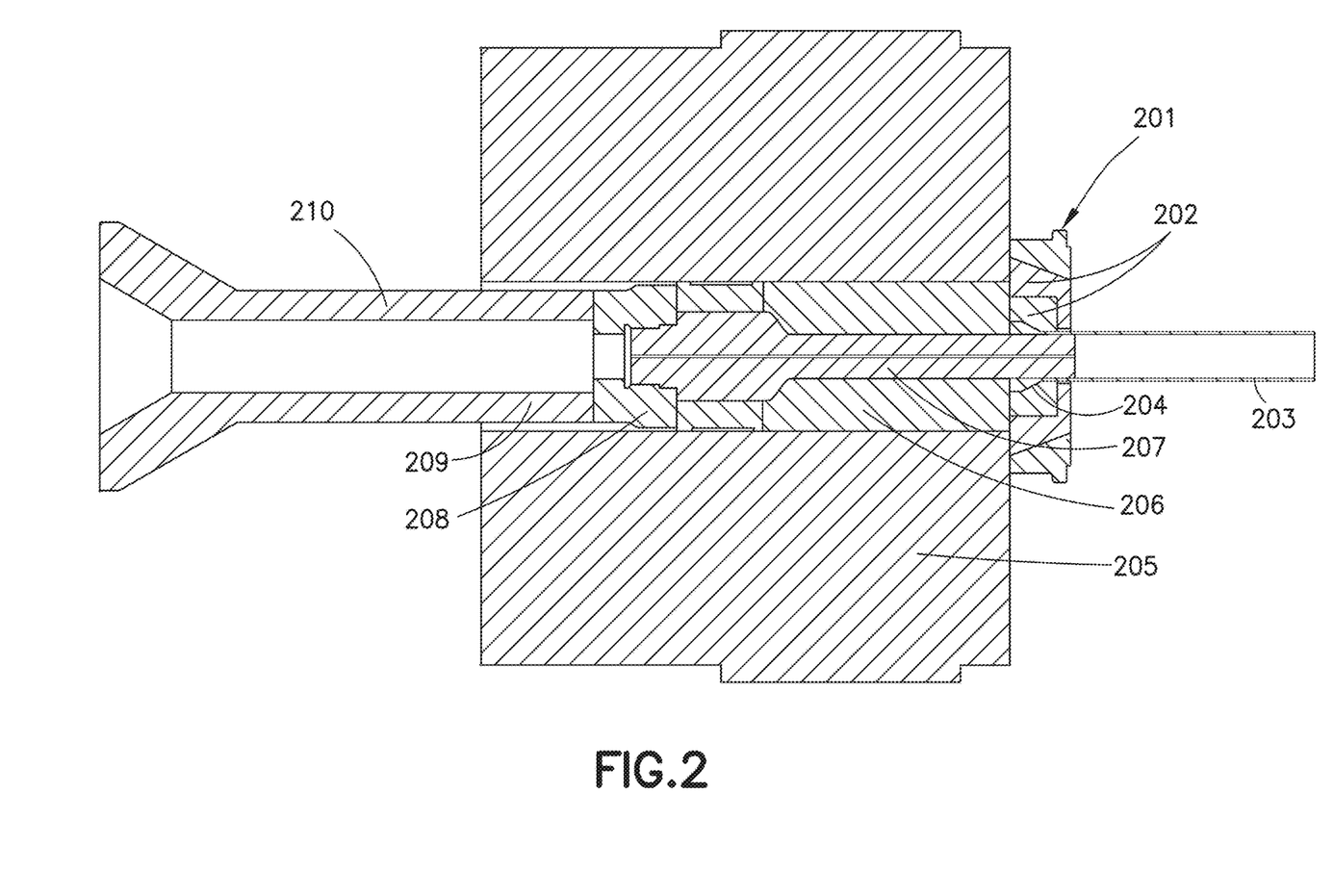

FIG. 2 illustrates the first extrusion step of an embodiment of the present invention. As used herein, the term "Small OD Tube" may be used interchangeably with "first tube section". FIG. 2 illustrates the beginning of the extrusion of a front, small OD tube. The ram assembly and mandrel move forward under force and crush the aluminum billet. The mandrel seats inside of extrusion front die and aluminum is forced through the die and over the mandrel, which forms the front, small OD tube and the stepped tube junction. The following are shown in FIG. 2: die holder (201), first set of die inserts installed in die holder (202), extruded small OD tube (203), stepped tube junction (204), cylinder container (205), aluminum hollow billet (206), mandrel (207), hollow dummy block (208), ram nose (209), and stem or ram (210).

Figure 3:
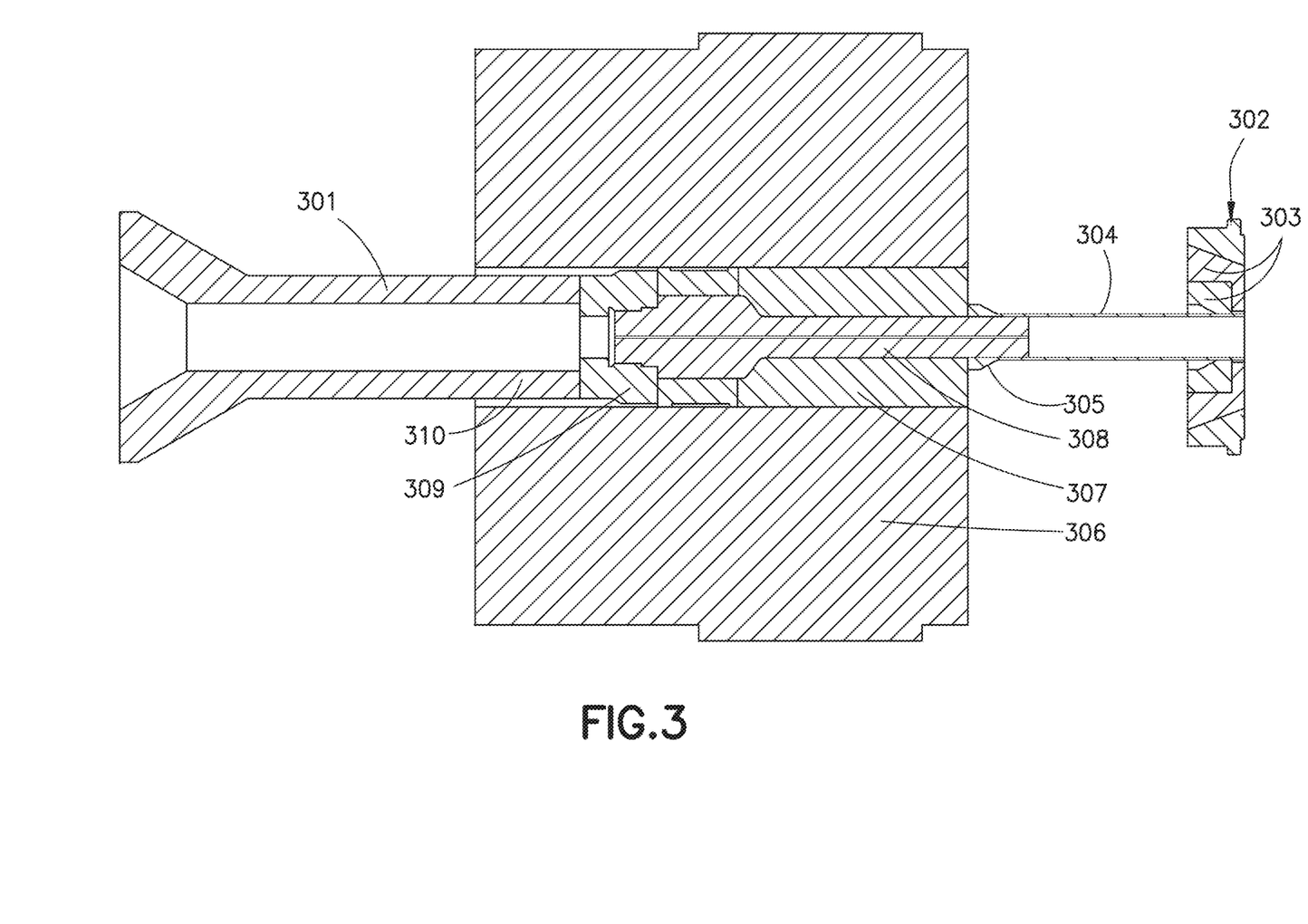

FIG. 3 illustrates the completion of the first extrusion step where the small OD tube (the first tube section) is extruded and the extrusion is terminated to allow removal of the first set of die inserts and the insertion of the second set of die inserts of an embodiment of the present invention. As used herein, the term "die inserts" may be used interchangeably with "die." FIG. 3 illustrates that, after the required length of the small OD tube has been extruded, the press extrusion force is relieved, and the die set is pulled back away from the junction of the stepped tube. Preparations are made to remove the first set of die inserts from the die holder. The following are shown in FIG. 3: stem or ram (301), die holder (302), first set of die inserts installed in die holder (303), extruded small OD tube (304), stepped tube junction (305), cylinder container (306), aluminum hollow billet (307), mandrel (308), hollow dummy block (309), and ram nose (310).

Figure 4:
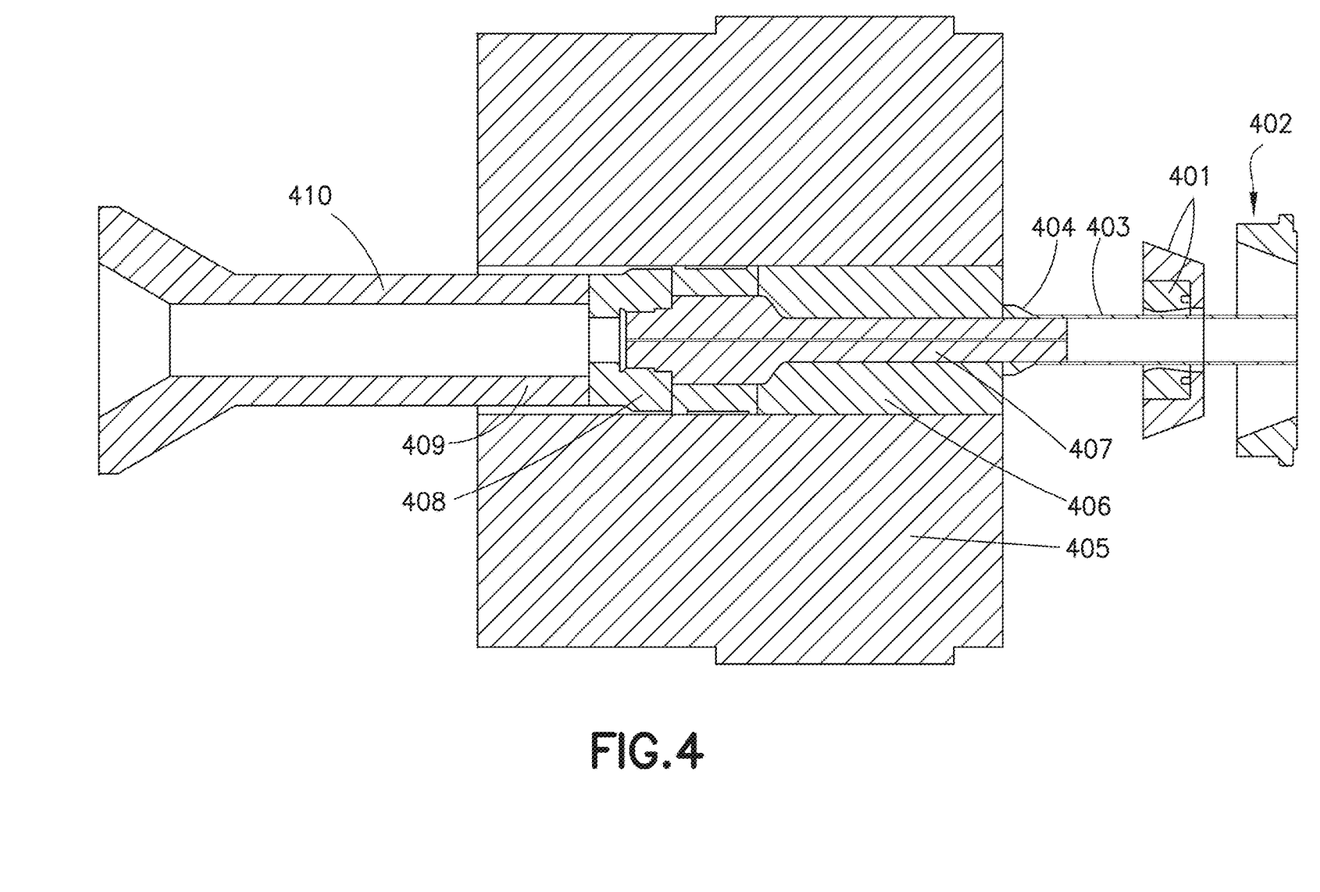
FIGS. 4-5 illustrate some embodiments of the method of the present invention to produce an extrudant using a second set of die.

FIG. 4 illustrates the second set of die inserts to be installed on the die holder according to an embodiment of the present invention. As used herein, the term "Large OD Tube" may be used interchangeably with "third tube section". FIG. 4 illustrates that, after the first set of die inserts have been removed, the second set of die inserts are installed into the die holder. The following are shown in FIG. 4: second set of die inserts for large OD tube (401), die holder (402), extruded small OD tube (403), stepped tube junction (404), cylinder container (405), aluminum hollow billet (406), mandrel (407), hollow dummy block (408), ram nose, (409), and stem or ram (410).

Figure 5:
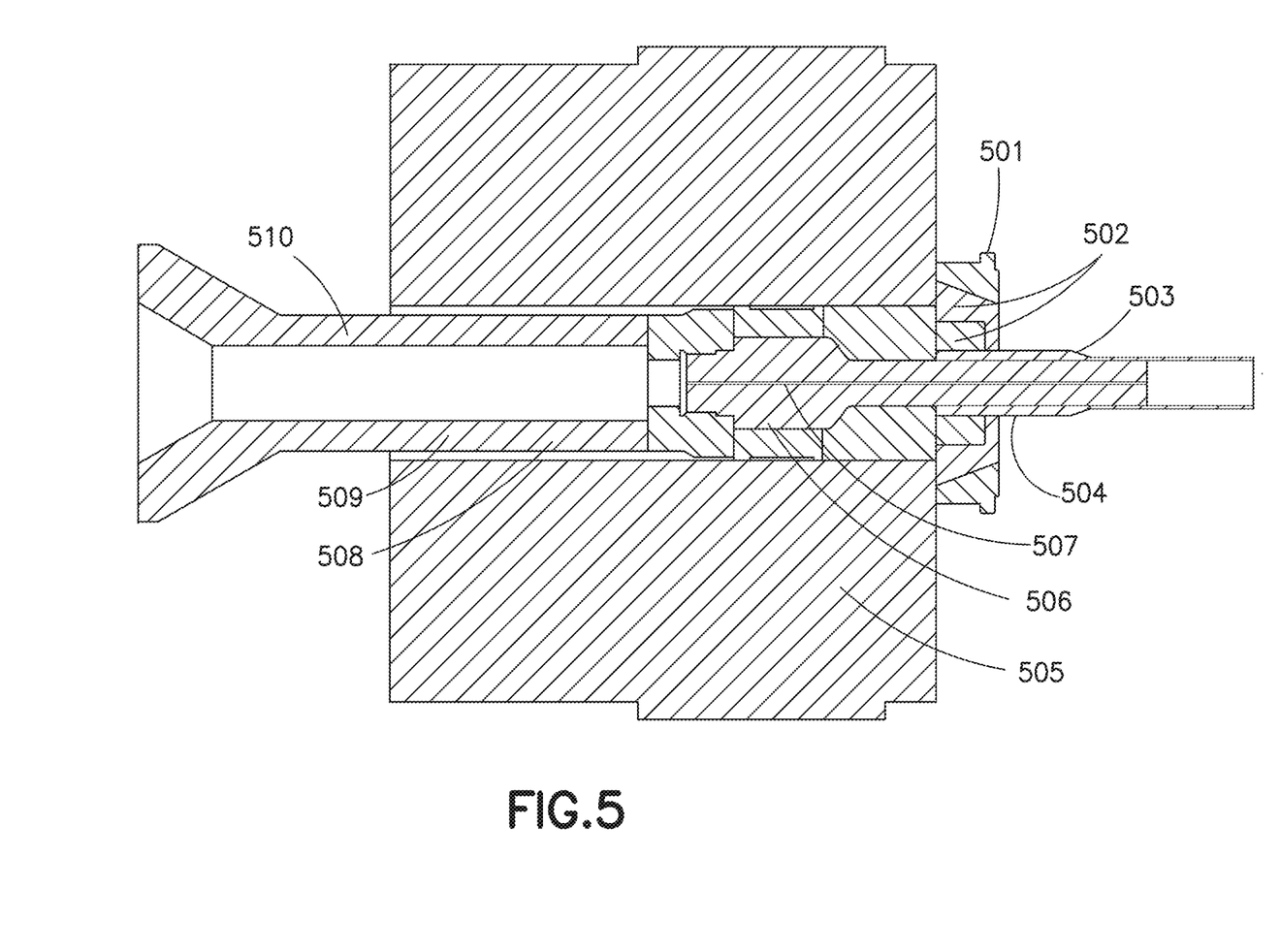

FIG. 5 illustrates the second and third extrusion steps where the second set of die inserts is positioned in the die holder and the second tube section and the Large OD tube are extruded. As used herein, "Stepped Tube Junction" may be used interchangeably with "second tube section." FIG. 5 illustrates the second set of die inserts have been installed in the die holder, and the die holder assembly is moved back into a locked position and the extrusion process begins again by applying force to the stem assembly and mandrel. The following are shown in FIG. 5: die holder (501), second set of die inserts for large OD tube (502), stepped tube junction (503), extruded large OD tube (504), cylinder container (505), aluminum hollow billet (506), mandrel (507), hollow dummy lock (508), ram nose (509), and stem or ram (510).

Figure 6:
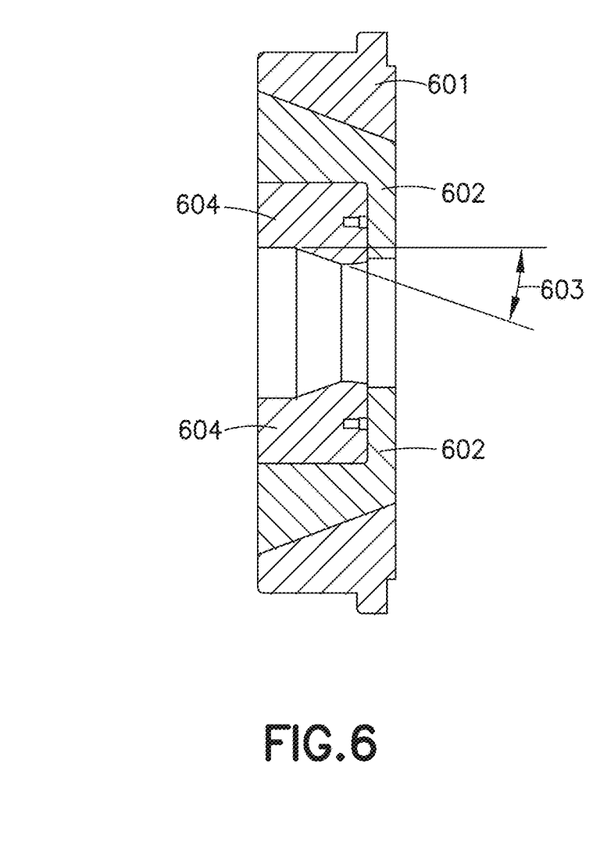
FIG. 6 illustrates the assembly of the second die and the die holder of an embodiment of the present invention.

FIG. 6 illustrates the assembly of the second die and the die holder of an embodiment of the present invention. As shown in FIG. 6, "X" depicts an angle of a wall of the first die section of the second die relative to a horizontal line. As used herein, "Tapered Step Junction" may be used interchangeably with "first die section". The following are shown in FIG. 6: stepped die holder (601), tube insert tapered holders (602), tapered step junction (603), and front tube inserts (604).

Figure 7:
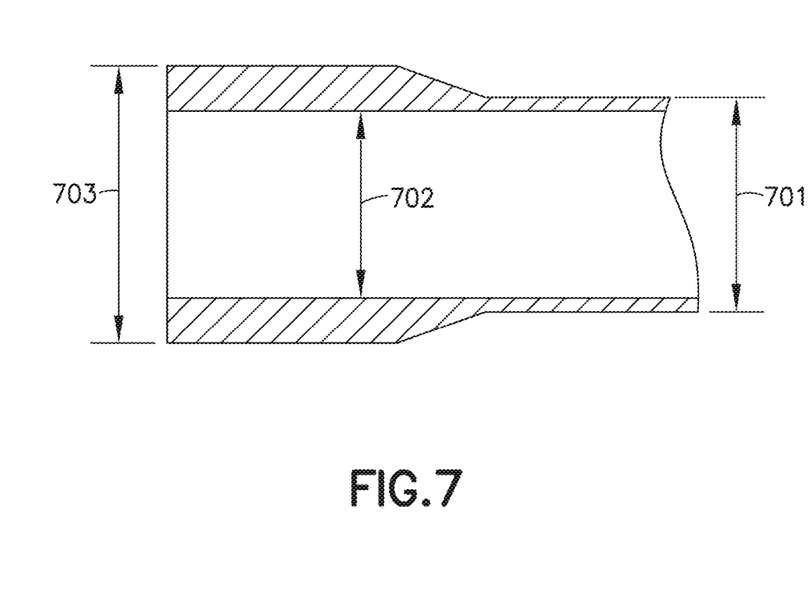
FIG. 7 illustrates an embodiment of a stepped tube produced according to the method of the present invention.

FIG. 7 illustrates a stepped tube produced according to the method of an embodiment of the present invention. As used herein, "Tube ID" may be used interchangeably with "inner diameter". The following are shown in FIG. 7, which shows a view of the tube junction created with tapered stepped die: minor OD (701), tube ID (702), and major OD (703).

Figure 8:
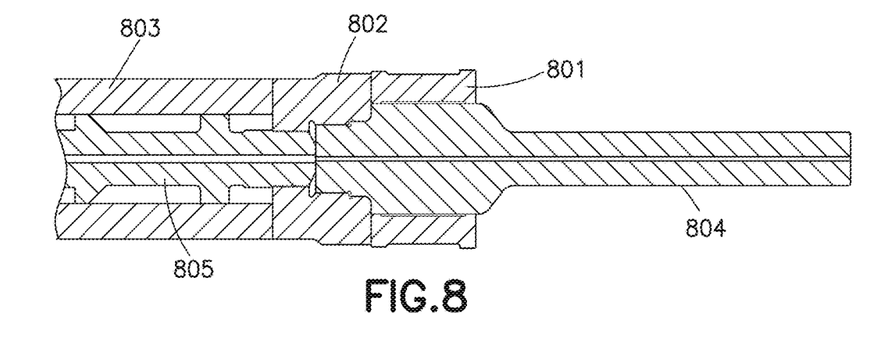
FIG. 8 illustrates a mandrel design according to an embodiment of the present invention.

FIG. 8 illustrates details of a mandrel design according to an embodiment of the present invention, the hollow dummy block used to seal the cylinder container during extrusion and the ram nose used to interface the hollow dummy block to the extrusion ram or stem of an embodiment of the present invention. The following are shown in FIG. 8: extrusion separate dummy block (801), extrusion fixed dummy block (802), extrusion main stem (803), stepped tube ID forming mandrel (804), and stem to fixed dummy block adapter (805).

Figure 9:
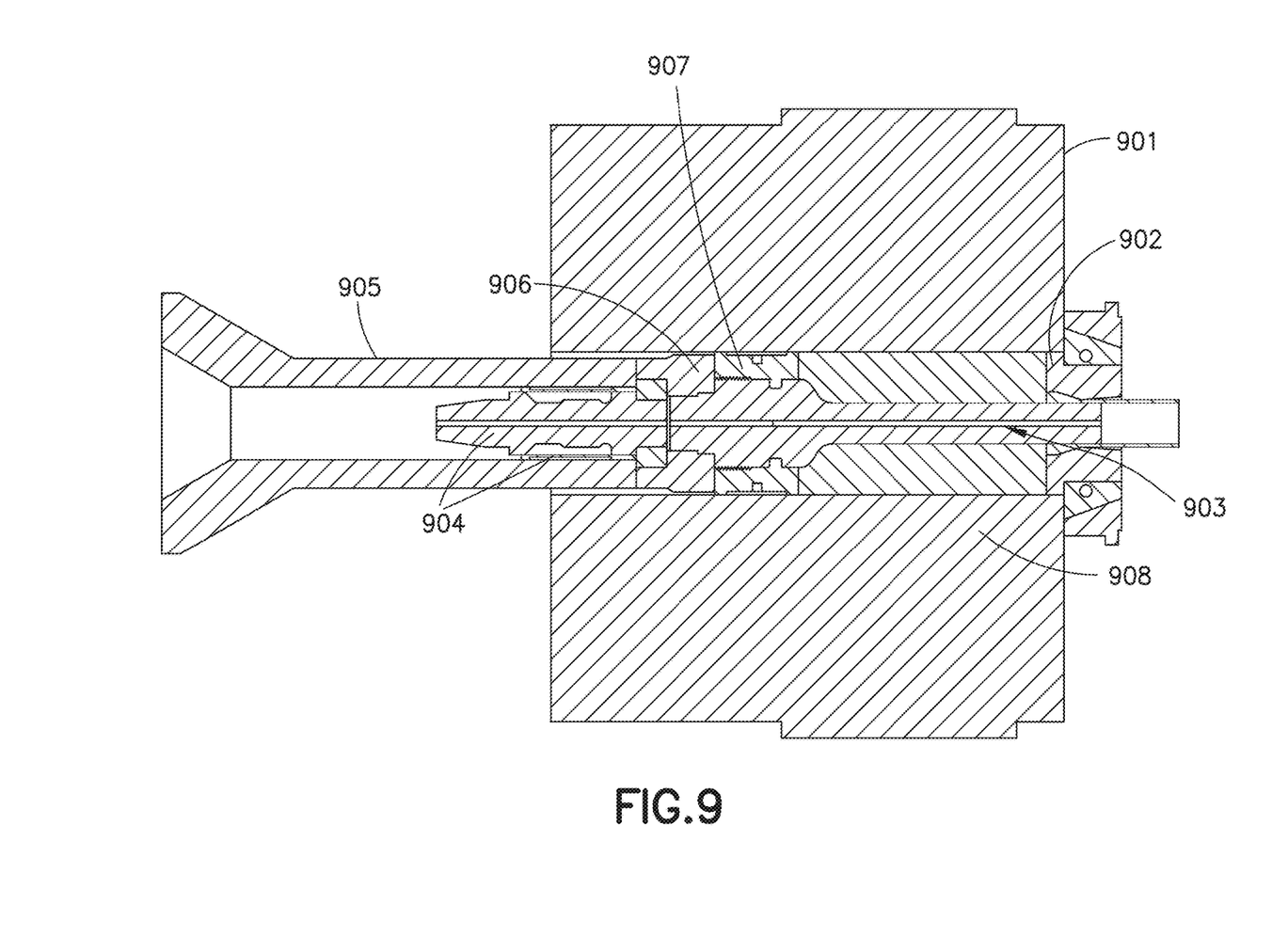
FIGS. 9-10 illustrate a system of an embodiment of the present invention to produce an extrudant.
Figure 10:
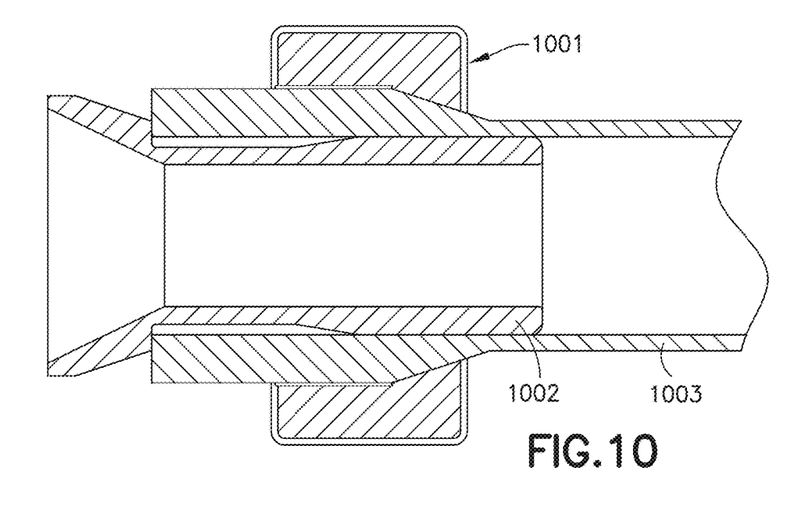

FIGS. 9-10 illustrate a system of an embodiment of the present invention that was used in an experimental trial in 2013.

FIG. 9 illustrates a cross-section of a system of an embodiment of the present invention used in the 2013 experimental trial. FIG. 9 illustrates tube forming inserts that extend into the cylinder-container for alignment, a fixed-detachable hollow dummy block, and a centering bushing on the mandrel manipulator adapter that is configured to center the mandrel OD to the cylinder-container ID of an embodiment of the present invention. The following are shown in FIG. 9: cylinder-container (901), snout nose die inserts for die center-line alignment with the cylinder-container ID (902), tube ID forming mandrel (903), mandrel manipulator adapter with bronze centering bushing for mandrel alignment to ID center-line of the cylinder-container (904), main press stem (905), fixed mandrel connection nose (906), fixed-detachable hollow dummy block (907), and extruded shape tube (908).

FIG. 10 illustrates a cross section of the tapered stretcher jaw and ID support insert with the extruded tube of an embodiment of the present invention used in the 2013 experimental trial. The following are shown in FIG. 10: tapered stretcher jaw (1001), ID support insert (1002), and extruded tube (1003).

Figure 11:
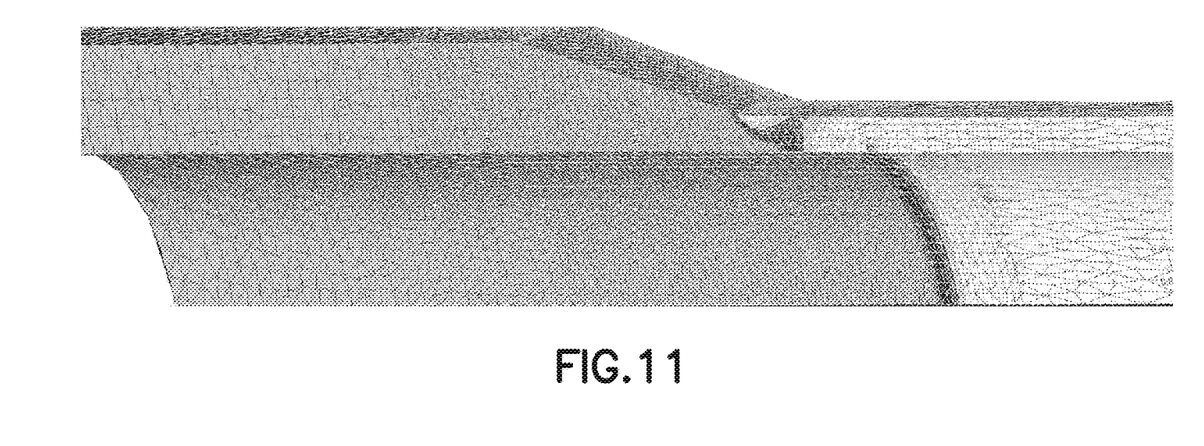
FIGS. 11 and 12 illustrate embodiments of an extrudant produced by the method of the present invention.

FIG. 11 illustrates the results of the 2013 trial. FIG. 11 shows the amount of permanent strain imparted to the tube if the extruded and heat treated tube is stretched such that the major and minor outside diameters (ODs) are gripped along the straight OD sides of the tube at a distance from the tapered junction that is at least 2× the major or minor outside diameter. Specifically, FIG. 11 shows the results of a parabolic tetrahedral finite element model of a ¼ symmetric section of a tapered extruded and heat treated tube showing the permanent strain imparted to the tube by stretching the tube gripped on the straight length outside diameters. FIG. 11 shows that there was no permanent strain imparted to the tube as the tube outside diameter begins the transition from the minor OD to the major OD. In some embodiments, "minor OD" is used interchangeably with "first outer diameter" and "major OD" is used interchangeably with "third outer diameter."

Figure 12:
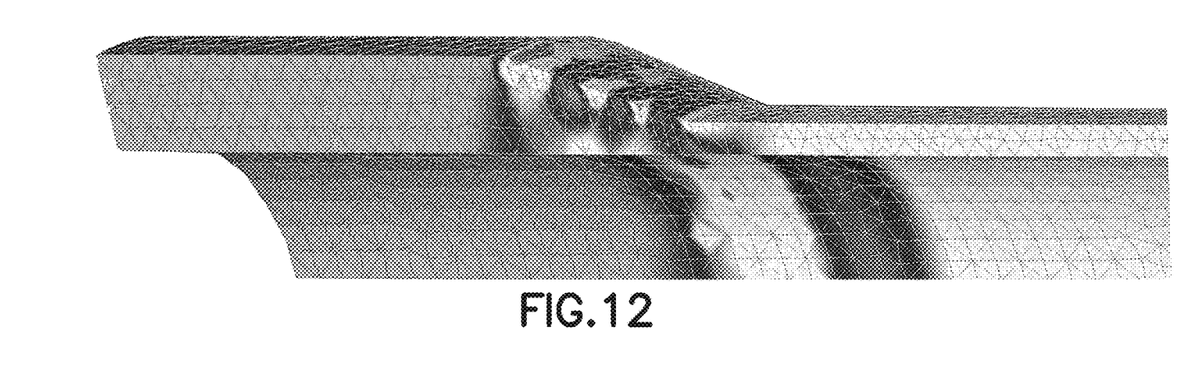

FIG. 12 illustrates the as-stretched plastic strain distribution determined by Finite Element Nonlinear Elastic-Plastic Analysis produced the embodiment of the present invention shown in FIG. 10. Specifically, FIG. 12 shows a parabolic tetrahedral finite element model of a ¼ symmetric section of a tapered extruded and heat treated tube showing the permanent strain imparted to the tube by stretching the tube gripped on the tapered junction as shown in FIG. 10. In FIG. 12, the periodic spots of red are attributes of the relatively coarse mesh density and non-linear contact element interaction with the ID surface of the tapered stretcher grip or jaw. Increasing the mesh density in the tube and on the surface of the tapered stretcher jaw will minimize this strain variation. This analysis demonstrates that permanent plastic strain is imparted to the tapered junction effectively work-hardening the material for increase material Yield Stress in this junction.

Figure 13:
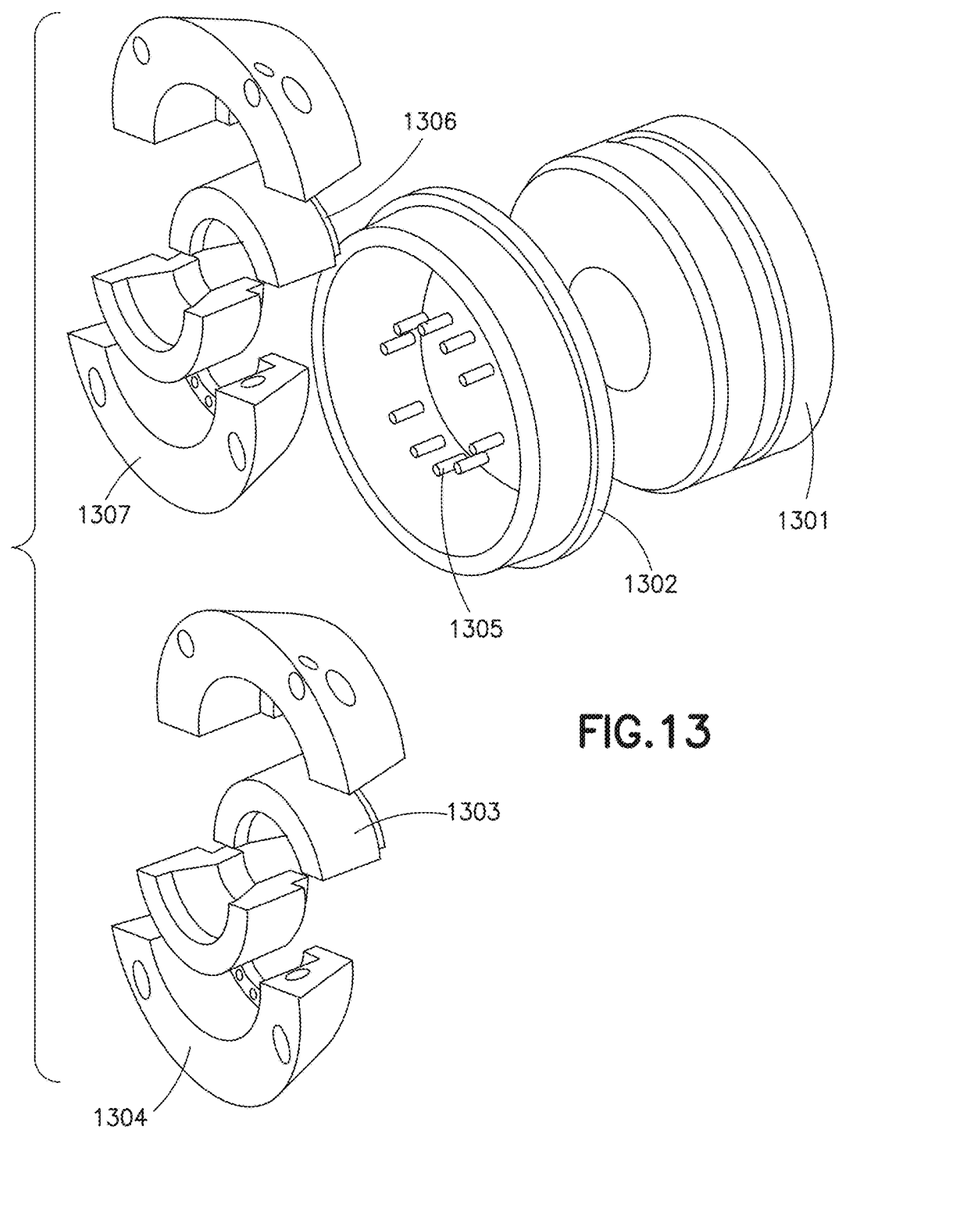
FIG. 13 illustrates an exploded view of the stepped die system used in an embodiment of the method of the present invention.
Figure 14A:
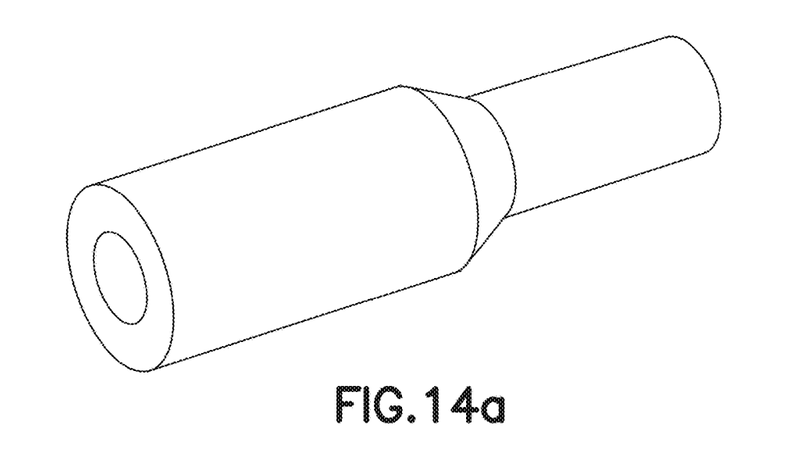
FIGS. 14a and 14b illustrate embodiments of extruded hollow tubes produced by the method of the present invention.
Figure 14B:
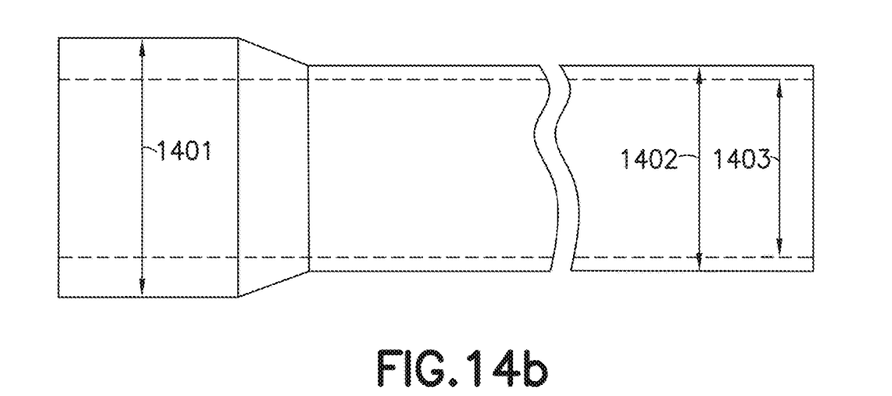

FIG. 13 illustrates an embodiment of the system of an embodiment of the present invention. The following shown in FIG. 13, which shows an exploded view of the step die system front and back dies: step die bolster (1301), step die holder (1302), step die insert alignment and pushout pins (1305), front die top and bottom insert (1306), front die top and bottom holders (1307), second die top and bottom insert (1303), and second die top and bottom holders (1304). FIGS. 14a and 14b illustrate tubes formed by the method of an embodiment of the present invention. FIG. 14a shows a stepped tube concept produced by the step die as disclosed herein. FIG. 14b shows an outside diameter A (1401), an outside diameter B (1402), and an inside diameter (1403).

In some embodiments, the instant invention provides for a method including: extruding, utilizing a first die and a mandrel, a hollow tube having a first tube section having a first outer tube diameter of Z, a first inner tube diameter, and a first length, where Z ranges from 1 inch to 10 inches; extruding, utilizing a second die and the mandrel, continuing from an end of the first tube section, a hollow tube having a second tube section having a second inner tube diameter and a second length, where the second die has a first die section having a first end and a second end, where the first end of the first die section of the second die has a first internal die diameter being equal to Z, where the second end of the first die section of the second die has a second internal die diameter of Y, where an internal die diameter of the first die section of the second die continuously vary along the length of the first die section of the second die from Z to Y of the second internal die diameter, and where an angle of a wall of the first die section of the second die relative to a longitudinal axis of the hollow tube ranges from 10 to 45 degrees; extruding, utilizing a second die section of the second die and the mandrel, continuing from an end of the second tube section, a third tube section having a third outer tube diameter being equaled to Y, a third inner tube diameter, and a third length, where Y ranges from 1.5 inches to 10 inches, where Z is less than Y; where the first inner tube diameter, the second inner tube diameter, and the third inner tube diameter are equal; and producing a monolithic hollow stepped tube extrudate.

In some embodiments, the method further includes using a step die holder and a step die bolster to hold the first and the second dies. In some embodiments, the second outer tube diameter continuously varies along the second length of the second tube section. In some embodiments, Z ranges from 3 inches to 6 inches. In some embodiments, Y ranges from 7 inches to 10 inches. In some embodiments, the angle of the wall of the first die section of the second die relative to the horizontal line ranges from 10 to 15 degrees. In some embodiments, the angle of the wall of the first die section of the second die relative to the horizontal line ranges from 15 and 18 degrees. In some embodiments, the hollow tube is an aluminum alloy, where the aluminum alloy is selected from the group consisting of: 1xxx, 2xxx, 3xxx, 4xxx, 5xxx, 6xxx, 7xxx, 8xxx, and 9xxx aluminum alloys.

In some embodiments, the instant invention provides for a tube, including: a monolithic hollow stepped tube extrudate, having: a first tube section having a first outer tube diameter of Z, a first inner tube diameter, and a first length, where Z ranges from 1 inch to 10 inches, a second tube section which continues from an end of the first tube section and has a second inner tube diameter, and a second length; where the second tube section has a first end and a second end, where the first end of the second tube section has an outer diameter equal to Z, where the second end of the second tube section has an outer diameter of Y, where a second outer tube diameter of the second tube section continuously varies from Z to Y; a third tube section which continues from the second end of the second tube section and has a third outer tube diameter equal to Y, a third inner tube diameter, and a third length, where Y ranges from 1.5 inches to 10 inches, where Z is less than Y; and where the first inner tube diameter, the second inner tube diameter, and the third inner tube diameter are equal; and where the second tube section is at an angle relative to a longitudinal axis of the third tube section and ranges from 10 to 45 degrees.

In some embodiments, the second outer tube diameter continuously varies along the second length of the second tube section. In some embodiments, Z ranges from 3 inches to 6 inches. In some embodiments, Y ranges from 7 inches to 10 inches. In some embodiments, the second tube section is at an angle relative to a longitudinal axis of the third tube section and ranges from 10 to 15 degrees. In some embodiments, the second tube section is at an angle relative to a longitudinal axis of the third tube section and ranges from 15 and 18 degrees. In some embodiments, the hollow tube is an aluminum alloy, and where the aluminum alloy is selected from the group consisting of: 1xxx, 2xxx, 3xxx, 4xxx, 5xxx, 6xxx, 7xxx, 8xxx, and 9xxx aluminum alloys.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A method comprising:
   extruding, utilizing a first die and a mandrel, a hollow tube having a first tube section having a first outer tube diameter of Z, a first inner tube diameter, and a first length, wherein Z ranges from 1 inch to 10 inches, wherein an internal diameter of the first die is equal to Z;
   extruding, utilizing a second die and the mandrel, continuing from an end of the first tube section, the hollow tube having a second tube section having a second inner tube diameter and a second length, wherein the second die has a first die section having a first end and a second end, wherein the first end of the first die section of the second die has a first internal die diameter being equal to Z, wherein the second end of the first die section of the second die has a second internal die diameter of Y, wherein an internal die diameter of the first die section of the second die continuously vary along the length of the first die section of the second die from Z to Y of the second internal die diameter, and wherein an angle of a wall of the first die section of the second die relative to a longitudinal axis of the hollow tube ranges from 10 to 45 degrees;
   extruding, utilizing a second die section of the second die and the mandrel, continuing from an end of the second tube section, a third tube section having a third outer tube diameter being equaled to Y, a third inner tube diameter, and a third length, wherein Y ranges from 1.5 inches to 10 inches, wherein Z is less than Y;
   wherein the first inner tube diameter, the second inner tube diameter, and the third inner tube diameter are equal; and
   producing a monolithic hollow stepped tube extrudate.

2. The method of claim 1, further comprising using a step die holder and a step die bolster to hold the first and the second dies.

3. The method of claim 1, wherein the second outer tube diameter continuously varies along the second length of the second tube section.

4. The method of claim 1, wherein Z ranges from 3 inches to 6 inches.

5. The method of claim 1, wherein Y ranges from 7 inches to 10 inches.

6. The method of claim 1, the angle of the wall of the first die section of the second die relative to the horizontal line ranges from 10 to 15 degrees.

7. The method of claim 1, the angle of the wall of the first die section of the second die relative to the horizontal line ranges from 15 and 18 degrees.

8. The method of claim 1, wherein the hollow tube is an aluminum alloy, and wherein the aluminum alloy is selected from the group consisting of: 1xxx, 2xxx, 3xxx, 4xxx, 5xxx, 6xxx, 7xxx, 8xxx, and 9xxx aluminum alloys.

* * * * *